May 22, 1951  R. E. BALLENTINE ET AL  2,554,233
BRAZING ALLOYS
Filed Oct. 20, 1948

WITNESSES:
Robert C. Baird
Rev. C. Groome

INVENTORS
Richard E. Ballentine &
Robert L. Zimmer.
BY
James R. Ely
ATTORNEY

Patented May 22, 1951

2,554,233

UNITED STATES PATENT OFFICE 2,554,233

BRAZING ALLOYS

Richard E. Ballentine, Snyder, and Robert L. Zimmer, Akron, N. Y., assignors to Westinghouse Electric Corporation, East Pittsburgh, Pa., a corporation of Pennsylvania Application October 20, 1948, Serial No. 55,446

8 Claims. (Cl. 75—153)

This invention relates to alloys and, in particular, to brazing alloys.

Brazing alloys of copper and phosphorus are well known in the art for use in brazing non-ferrous metals. In general, the known brazing alloys of this type have a low melting point and are very fluid when molten, thereby insuring a thorough penetration of the brazing alloy into the joint to be brazed even though the joint has a small clearance. The presence of phosphorus in such brazing alloy renders the alloy capable of reducing or dissolving oxides of copper as they form on heating where the alloy is employed in brazing copper. Such characteristic makes it possible to obtain a clean surface which is readily and easily wet by the brazing alloy without the use of a flux.

Such brazing alloys are, however, quite brittle and unless the parts to be joined are very closely aligned with small clearances at the joints, an inferior brazed joint will be obtained. The brittleness of the copper-phosphorus alloys also makes it difficult to manufacture the brazing alloys in the forms desired and, in particular, in the form of wire having a diameter of less than $\frac{1}{16}$ inch.

Further, although the known copper-phosphorus brazing alloys dissolve oxides as referred to hereinbefore, it is found that they perform such function only when molten while being subject themselves to a very rapid rate of oxidation at elevated temperatures in both the solid and liquid state. In a number of brazed joints which had been held for long periods of time at the brazing temperature, it has been found that the tensile strength of the brazed joint is detrimentally decreased. Since the oxidation rate of the copper-phosphorus alloys at 1,000° F. is about ten times that of pure copper, it can be appreciated that such oxidation characteristics has a detrimental effect on the ultimate strength of the brazed joint.

An object of this invention is to provide a copper-phosphorus brazing alloy having a low rate of oxidation.

Another object of this invention is to provide a ductile copper-phosphorus brazing alloy having a low rate of oxidation.

A further object of this invention is the provision of a copper-phosphorus alloy containing beryllium for imparting a low rate of oxidation thereto.

Figure 1:
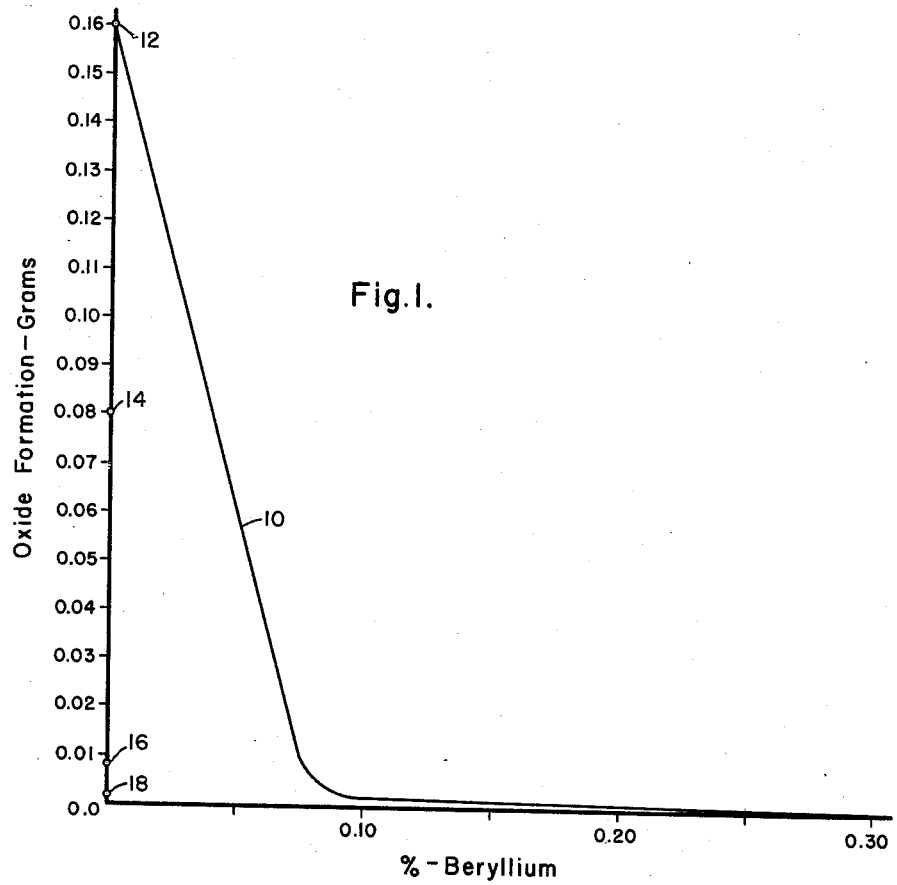
Figure 2:
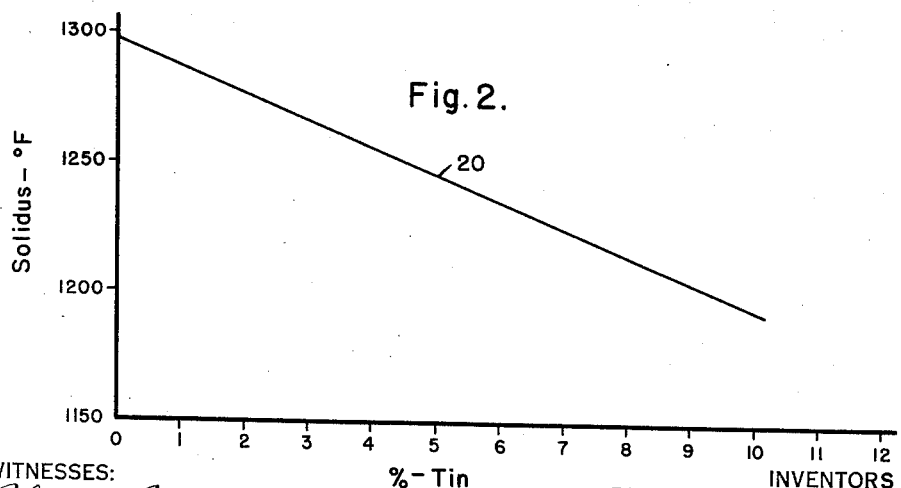

Other objects of this invention will become apparent from the following description when taken in conjunction with the accompanying drawing, in which:

Figure 1 is a graph, the curve of which illustrates the effect of beryllium on the oxidation rate of copper-phosphorus alloys; and Fig. 2 is a graph, the curve of which illustrates the effect of tin on the solidus temperature of a copper-phosphorus alloy which contains beryllium.

The basic alloy of this invention comprises a copper base alloy containing from 4.5% to 7.5% by weight of phosphorus and from 0.01% to 0.3% by weight of beryllium. In addition to the beryllium content, the alloy may contain from 0.5% to 10% by weight of tin and/or from small but effective amounts up to 20% by weight of silver as will be explained more fully hereinafter.

In producing the alloy of this invention, it is found that if more than 7.5% phosphorus is contained in the alloy, the resulting alloy becomes brittle, rendering it difficult to manufacture. On the other hand, if less than 4.5% phosphorus is present in the alloy, then it is found that the resulting alloy does not have self-fluxing characteristics.

The inclusion of beryllium in the copper-phosphorus alloys has a very beneficial effect on the characteristics of the alloy. Referring to Fig. 1, curve 10 illustrates the decrease in the oxidation rate of a copper-phosphorus alloy containing 7% phosphorus as the beryllium content is increased from zero to 0.3%, the tests being conducted on 10 gram test rods of $\frac{1}{8}$ inch diameter as exposed to heat at 1,000° F. for 15 minutes. As is evident from the curve, with only 0.07% beryllium present in the alloy, the oxidation rate at 1,000° F. is reduced by a factor of 10, whereas with 0.3% beryllium present, the oxidation rate is reduced to substantially zero.

The improved results are apparent from the curve, especially when compared to point 12 which represents the oxidation rate of a commercial brazing alloy consisting of 7% phosphorus and the balance copper or with the point 14 which represents the oxidation rate of a commercial brazing alloy composed of 5% phosphorus, 15% silver, and the balance copper. Similar comparisons may be made with points 16 and 18 which represent the oxidation rates of copper and brass, respectively, under the same test conditions.

It is also found that the copper-phosphorus alloys containing up to 0.10% beryllium have excellent self-fluxing characteristics but that as the beryllium content is increased above 0.10%, the alloy loses its wetting characteristics so that it becomes necessary to use a flux. If more than 0.3% beryllium is contained in the alloy, the alloy becomes useless as a brazing alloy as it is found that the oxide formed with such alloy during brazing is not broken up even with a strong fluoride flux.

As examples of alloys within the ranges given hereinbefore, reference may be had to a ternary alloy consisting of 7% phosphorus, 0.03% beryllium and 92.97% copper or to the alloy consisting of 7% phosphorus, 0.05% beryllium and 92.95% copper, which alloys have a solidus temperature of about 1292° F. and a liquidus temperature of about 1500° F. Both of these alloys may be utilized to braze non-ferrous metals without a flux and result in brazed joints having tensile strengths which average 2,000 pounds per square inch higher than joints made with binary copper-phosphorus alloys containing 7% phosphorus.

In accordance with this invention, it has also been found that additions of tin in amounts ranging from 0.50% to 10% to alloys containing 0.01 to 0.3% beryllium, 4.5% to 7.5% phosphorus and the balance copper are beneficial in effecting a reduction in the melting point of the alloy while at the same time increasing the ductility of the resulting alloy. Referring to Fig. 2 of the drawing, curve 20 clearly illustrates the effect of additions of tin on the solidus temperature of alloys containing 7% phosphorus, 0.05% beryllium and the balance copper. As is evident, the solidus temperature is greatly decreased as the tin content is increased.

While it has been stated that by increasing the tin content, the melting point is lowered, it is desired to point out, however, that if tin additions in amounts greater than 10% are present, then the alloy becomes hot-short and the fluidity of the alloy is so impaired that the resulting alloys are not self-fluxing.

A preferred four-element brazing alloy within the range given is one having a composition of 2% tin, 0.03% beryllium, 7% phosphorus and 90.97% copper. Such alloy has a solidus temperature of 1275° F. and a liquidus temperature of 1480° F.

Another preferred four-element alloy within the range given is one composed of 7% phosphorus, 3% tin, 0.05% beryllium and the balance copper, which has a melting range of 1270° F. to approximately 1500° F., as compared to the melting range of 1312° F. to 1500° F. for a binary copper base alloy containing 7% phosphorus. This alloy has sufficient ductility that it can be formed into different required shapes, such as rings, without heating and can be used in making joints between copper articles without employing a flux. The tensile strength of the resulting joints also shows an average increase of 2,000 pounds per square inch over the strength of joints made with the binary copper-phosphorus alloy containing 7% phosphorus.

Excellent results can also be obtained by the addition of silver in amounts ranging from small but effective amounts up to 20% to the basic ternary alloy containing 0.01% to 0.3% beryllium, 4.5% to 7.5% phosphorus and the balance copper, it being found that the addition of silver to such alloys increases the ductility of the resulting alloy and also tends to lessen the oxidation rate. Additions of silver in amounts greater than 20% however have no special advantage over the lower silver contents but do add greatly to the cost of the alloy.

A preferred alloy within the latter range is one having a composition of 15% silver, 0.03% beryllium, 5% phosphorus and 79.97% copper. This alloy has a solidus temperature of 1180° F. and a liquidus temperature of about 1500° F. Such alloy gives improved results with respect to tensile strength, it being found that brazed joints utilizing this alloy have an average increase of 3,000 pounds per square inch over a similar joint formed with a binary copper-phosphorus alloy containing 5% phosphorus.

In all cases, the beryllium functions in the copper-phosphorus alloys to decrease the oxidation rate of the alloy as well as decreasing the solidus temperature thereof while improving the ductility. With the beryllium content controlled, it is possible to produce either a self-fluxing brazing alloy or one which will require the use of a flux depending upon whether or not the beryllium content is below or above 0.1% as referred to hereinbefore. The alloys are readily produced and are sufficiently ductile for formation into required shapes and sizes for commercial use, the compositions of the alloys being readily reproduced.

We claim as our invention:

1. A brazing alloy composed of, a predominating proportion of copper, from 4.5% to 7.5% phosphorus, and from 0.01% to 0.3% beryllium.

2. A brazing alloy composed of, a predominating proportion of copper, from 4.5% to 7.5% phosphorus, from 0.5% to 10% tin, and from 0.01% to 0.3% beryllium.

3. A brazing alloy composed of 4.5% to 7.5% phosphorus, from 0.01% to 0.3% beryllium, and the balance copper.

4. A brazing alloy composed of 4.5% to 7.5% phosphorus, from traces to 10% tin, from 0.01% to 0.3% beryllium, and the balance copper.

5. A brazing alloy composed of 4.5% to 7.5% phosphorus, from small but effective amounts up to 20% silver, from 0.01% to 0.3% beryllium, and the balance copper.

6. A brazing alloy consisting of 7% phosphorus, 0.05% beryllium, and the balance copper.

7. A brazing alloy consisting of 7% phosphorus, 3% tin, 0.05% beryllium, and the balance copper.

8. A brazing alloy consisting of 5% phosphorus, 15% silver, 0.03% beryllium, and the balance copper.

RICHARD E. BALLENTINE.
ROBERT L. ZIMMER.

REFERENCES CITED

The following references are of record in the file of this patent:

UNITED STATES PATENTS

| Number | Name | Date |
| --- | --- | --- |
| 1,652,107 | Eschholz | Dec. 6, 1927 |
| 1,829,903 | Leach | Nov. 3, 1931 |
| 1,966,260 | Munson | July 10, 1934 |
| 1,988,422 | Miller | Jan. 15, 1935 |
| 2,125,680 | MacGregor | Aug. 2, 1938 |
| 2,136,212 | Hensel et al. | Nov. 8, 1938 |
| 2,196,304 | Hensel et al. | Apr. 9, 1940 |
| 2,390,775 | Christ | Dec. 11, 1945 |
| 2,408,342 | Rodda | Sept. 24, 1946 |

OTHER REFERENCES

"Metals Handbook," 1939 ed., published by the American Society for Metals, pages 1344 and 1345.

"Chapters in the Chemistry of the Less Familiar Elements," by Hopkins, vol. I, published by the Stipes Publishing Co., Champaign, Ill., chapter 5, page 9.